United States Patent
Fischer

(10) Patent No.: US 7,954,618 B2
(45) Date of Patent: Jun. 7, 2011

(54) STARTING CLUTCH, PARTICULARLY FOR RACING AND SPORTS VEHICLES

(75) Inventor: Klaus Fischer, Stockdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/786,085

(22) Filed: May 24, 2010

(65) Prior Publication Data

US 2010/0230229 A1 Sep. 16, 2010

Related U.S. Application Data

(63) Continuation of application No. PCT/EP2009/000236, filed on Jan. 16, 2009.

(30) Foreign Application Priority Data

Feb. 28, 2008 (DE) .......................... 10 2008 011 634

(51) Int. Cl.
*F16D 13/71* (2006.01)
(52) U.S. Cl. .................... 192/89.25; 192/89.22; 267/162
(58) Field of Classification Search .... 192/89.22–89.25; 267/162
See application file for complete search history.

(56) References Cited

U.S. PATENT DOCUMENTS

| 3,758,094 | A | * | 9/1973 | Crutchley et al. ............. 267/162 |
| 3,791,499 | A | * | 2/1974 | Ryan .......................... 192/70.27 |
| 5,400,887 | A |   | 3/1995 | Mizukami et al. |
| 5,671,834 | A | * | 9/1997 | Mizukami et al. ......... 192/89.23 |
| 5,730,267 | A |   | 3/1998 | Lopez |
| 5,960,921 | A | * | 10/1999 | Hofmann et al. ........... 192/70.27 |
| 2004/0262113 | A1 | * | 12/2004 | Rudolf et al. .............. 192/70.27 |

FOREIGN PATENT DOCUMENTS

| DE | 43 26 501 A1 | 2/1994 |
| DE | 44 07 260 A1 | 9/1995 |
| DE | 10 2004 029 881 A1 | 1/2005 |
| DE | 10 2006 012 809 A1 | 9/2007 |
| FR | 2 546 999 A1 | 12/1984 |
| WO | WO 2006/067399 A1 | 6/2006 |

OTHER PUBLICATIONS

German Search Report dated Jul. 15, 2008 including partial English-language translation (Nine (9) pages).
International Search Report dated Jul. 31, 2009 including English-language translation (Four (4) pages).

* cited by examiner

*Primary Examiner* — Richard M. Lorence
(74) *Attorney, Agent, or Firm* — Crowell & Moring LLP

(57) ABSTRACT

A starting clutch, particularly for racing and sports vehicles, has clutch plates, of which at least one is non-rotatably coupled with a clutch cage of the starting clutch and at least one is non-rotatably coupled with a clutch hub of the starting clutch. A set of springs composed of at least two diaphragm-spring-type spring elements presses the clutch plates together when the starting clutch is closed and permits a torque transfer from the clutch cage to the clutch hub and vice-versa. Viewed from the clutch plates, the first or second spring element has at least a first elevation on its side facing the respective second or first spring element, which elevation presses against the respective second or first spring element when the starting clutch is closed.

7 Claims, 1 Drawing Sheet

STARTING CLUTCH, PARTICULARLY FOR RACING AND SPORTS VEHICLES

CROSS REFERENCE TO RELATED APPLICATIONS

This application is a continuation of PCT International Application No. PCT/EP2009/000236, filed Jan. 16, 2009, which claims priority under 35 U.S.C. §119 from German Patent Application No. DE 10 2008 011 634.3, filed Feb. 28, 2008, the entire disclosures of which are herein expressly incorporated by reference.

BACKGROUND AND SUMMARY OF THE INVENTION

The present invention relates to a starting clutch, particularly for racing and sports vehicles, having clutch plates, of which at least one is non-rotatably coupled with a clutch cage of the starting clutch and at least one is non-rotatably coupled with a clutch hub of the starting clutch. A spring assembly composed of at least two diaphragm-spring-type spring elements presses the clutch plates together when the starting clutch is closed and permits a torque transfer from the clutch cage to the clutch hub and vice-versa. A starting clutch of the concerned type is known from German Patent Document DE 10 2006 012 809 A1.

Multi-plate clutches having a stack of plates consisting of several individual plates are generally used as starting clutches in racing and sports vehicles. In order to generate the contact pressure force between the plates that is necessary for torque to be transmitted, and to simultaneously achieve a compact construction of the clutch, very rigid clutch springs are required. Diaphragm springs, which are arranged in tandem in a stacked manner, are normally used as clutch springs.

In order to reach an optimal starting acceleration, an exact control of the clutch is necessary. Because of the rigid spring characteristic of the set of clutch springs, even small changes of the release position of the clutch will cause relatively large changes of the transferable torque. Especially if the clutch is opened too far, the desired driving power can not at all be transferred to the wheels. If, in contrast, the clutch is opened too little, there is the danger that too much power will be transferred to the driving wheels, which will then cause a spinning of the driving wheels and, as a result, an acceleration breakdown. In order to permit a more exact controlling or automatic controlling of the clutch, it was suggested in German Patent Document DE 10 2006 012 809 that the spring elements and the release element be constructed such that, starting from the closed condition of the clutch, when the clutch is gradually opened, at first only some of the existing spring elements are actuated by the release element and additional, or all, existing spring elements are actuated only after a further displacement path.

Inversely, during the closing of the clutch, at first only some of the spring elements are relieved or loaded, which permits the transfer of a partial torque of the maximally transferable torque. It is only after a further displacement path of the release element that additional or all spring elements of the clutch are relieved or loaded, which will then permit a transfer of the maximal possible clutch torque.

As a result of such a "stepped actuation" of the spring elements, a correspondingly stepped clutch characteristic is obtained (transferable torque as a function of the release path of the clutch), which has at least one plateau-type curve region extending along a predefined displacement path. In this curve region, the torque transferable by the clutch will be constant under mechanically ideal conditions or will change only relatively little along the displacement path.

However, interfering influences may occur in practice which may lead to considerable deviations from the theoretically given curve characteristic. Thus, friction parameters of the clutch may fluctuate from one actuating operation to another. Specifically, when actuating the set of clutch springs, a radial relative displacement of the mutually contacting diaphragm springs will occur to a certain extent as a result of the deformation of the diaphragm springs at the contact surfaces of the individual diaphragm springs. The frictional conditions occurring in this case depend on a plurality of parameters, such as the temperature, the lubrication, the dirt accumulation, etc. Particularly, the frictional relationships between the clutch spring (the so-called starting spring) that is first viewed from the stack of plates and the second clutch spring arranged behind the first clutch spring have a direct influence on the controllability or automatic controllability of a starting clutch.

It is an object of the invention to provide a starting clutch such that the controllability or automatic controllability of the clutch is improved during the start, i.e. during the closing of the clutch.

This and other objects are achieved by a starting clutch particularly for racing and sports vehicles, having clutch plates, of which at least one is non-rotatably coupled with a clutch cage of the starting clutch and at least one is non-rotatably coupled with a clutch hub of the starting clutch. The clutch cage can be flanged directly to the crankshaft of the engine, and the clutch hub can be connected to a transmission input shaft. Furthermore, a set of springs (spring assembly) is provided having at least two diaphragm-spring-type spring elements, which springs press the clutch plates together when the starting clutch is closed and permit a torque transfer from the clutch cage to the clutch hub and vice-versa. Advantageous developments and further developments of the invention are contained in the subclaims.

The invention is based on a recognition that the lower and the more constant the frictional relationships are between the first two spring elements—viewed from the clutch plates—the better the clutch can be controlled or automatically controlled. According to the invention, viewed from the clutch plates, the first or the second spring element has at least one elevation on its side facing the second or first spring element, respectively, which elevation presses against the respective second or first spring element when the starting clutch is closed.

In contrast to the state of the art, for example the clutch described in German Patent Document DE 10 2006 012 809 A1, the two first spring elements therefore no longer contact one another in a large-surface or full-surface manner, but at least at one first elevation. This reduces the friction between the two first spring elements. The frictional conditions between the two first spring elements thereby clearly become more constant; i.e. they will no longer vary as much as in the case of conventional starting clutches.

The spring element that is first or second viewed from the clutch plates preferably has at least a second elevation on its side facing the respective second or first spring element, which second elevation presses against the respective second or first spring element when the starting clutch is closed.

The first elevation and the second elevation have different distances from an axis of rotation of the starting clutch. By means of the mutually radially spaced elevations, a defined distance between the two first springs can be provided. The two elevations preferably have the same "height" in the longitudinal direction of the axis of rotation of the starting clutch, so that the two first springs will be parallel to one another when they are pressed against one another. As an alternative thereto, it may also be provided that the at least one, first and the at least one, second elevation have different heights, which implies that the diaphragm springs do not absolutely have to be parallel when they are pressed against one another.

According to a further development of the invention, the second elevation is located radially outside of the first elevation with respect to the axis of rotation of the starting clutch. Preferably, the elevations are provided on the side of the first spring element facing the second spring element.

The elevations may each have the shape of a closed "cutting-edge-type" ring. As an alternative, the at least one, first elevation and the at least one, second elevation can also be formed by several cutting-edge-type ring sections spaced apart from one another in the circumferential direction. Instead of ring sections, a plurality of "contact points" forming the elevations are also contemplated.

According to a further development of the invention, a ring-shaped pressure element is arranged between the first spring element viewed from the clutch plates and the first clutch plate. The pressure element may have the shape of a ring-shaped pressure plate. An area of highest surface pressure is situated between the first clutch plate and the pressure element or the pressure plate. The first elevation is preferably at essentially the same radial distance from the axis of rotation of the starting clutch as the region of the highest surface pressure. As a result, it is ensured that the contact pressure force transferred from the first spring element is optimally introduced into the pressure element or the pressure plate of the starting clutch. The surface pressure can correspondingly be reduced as a result of a plane contact.

According to a further development of the invention, the starting clutch has a release element which can be displaced along the axis of rotation of the clutch. By displacing the release element, the spring elements can be deformed such that the starting clutch is opened. In a manner similar to the manner of the starting clutch described in German Patent Document DE 10 2006 012 809 A1, the spring elements and the release element may be constructed such that, starting from a position in which the starting clutch is completely closed, during displacement of the release element, the latter at first actuates only some of the spring elements and actuates additional (or the remaining) existing spring elements only after a further displacement path.

According to a further development of the invention, the spring elements and the release element are constructed such that, starting from a position in which the starting clutch is completely closed, during displacement of the release element, the latter actuates only the second and possibly existing further spring elements and actuates the first spring element (starting spring) only after a further displacement path.

Furthermore, it may be provided that the first spring element has a larger inside diameter than the second spring element and the release element has at least two driving areas or driving sections.

It is explicitly pointed out that the entire disclosure content of German Patent Document DE 10 2006 012 809 A1 is expressly incorporated by reference herein. All characteristics, ideas or partial ideas explicitly or implicitly contained in German Patent Document DE 10 2006 012 809 A1 can therefore literally or analogously be applied herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
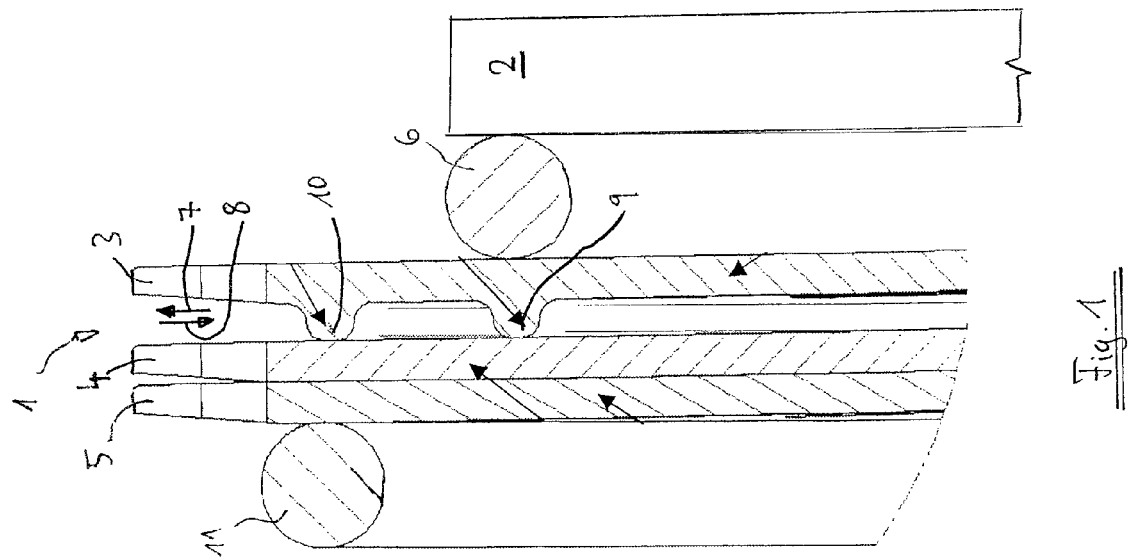
FIG. 1 is a sectional view of the diaphragm springs of a starting clutch according to an embodiment of the invention.

FIG. 1 is a sectional view of a set of diaphragm springs 1 of a starting clutch for sports and racing vehicles. Viewed from a stack 2 of clutch plates, the set 1 of diaphragm (or disk) springs has a first diaphragm spring 3, a second diaphragm spring 4 and a third diaphragm spring 5. The first diaphragm spring 3 is also called the "starting spring" because, during the closing of the starting clutch, it is the first one of the diaphragm springs 3-5 that exercises a contact pressure force onto the stack 2 of clutch plates and is therefore decisive with respect to the extent of the torque transferable during starting. The "starting spring" presses against a pressure element or a pressure plate 6, which transfers the contact pressure force exerted by the set 1 of diaphragm springs to the stack 2 of clutch plates.

During actuation of the starting clutch (or the set 1 of diaphragm springs), the deformation of the diaphragm springs viewed in the radial direction of the starting clutch, to a limited extent, causes a relative displacement of the diaphragm springs, particularly of the first two diaphragm springs 3, 4, which is indicated by arrows 7, 8. The lower the friction between the diaphragm springs, particularly between the starting spring 3 and the second diaphragm spring 4, the more precisely the starting clutch can be controlled or automatically controlled during the starting operation. A comparatively low friction between the first two diaphragm springs 3, 4 can be produced in that one of the two mutually facing contact surfaces of the two diaphragm springs 3, 4 is provided with annularly surrounding "cutting-edge-type" elevations 9, 10.

In the embodiment illustrated here, a first annularly surrounding elevation 9 and, further radially thereof, a second annularly surrounding elevation 10 are provided. The first elevation 9 has essentially the same distance from the axis of rotation (not shown) of the starting clutch as the contact area between the first diaphragm spring 3 and the pressure plate 6. In the embodiment illustrated here, a line contact exists between the pressure plate 6 and the first diaphragm spring 3. In principle, the first diaphragm spring 3 and the pressure plate 6 may also contact one another in a planar manner. In this case, the first elevation 9 should have essentially the same radial distance from the axis of rotation of the starting clutch as the area in which the highest surface pressure occurs between the first spring element 3 and the pressure plate 6.

The two surrounding cutting-edge-type elevations 9, 10 ensure, on the one hand, that when the clutch is closed, the two diaphragm springs 3, 4 are essentially aligned parallel to one another. It is essential that, as a result of the two elevations 9, 10, only two line contacts are present between the two diaphragm springs 3, 4, which reduces the friction between the diaphragm springs 3, 4 and leads to relatively constant frictional relationships between the diaphragm springs 3, 4.

For reasons of completeness, an annular cutting edge or a ring-shaped support 11 should be mentioned, by which the third diaphragm spring 5 is supported, for example, with respect to a casing of the starting clutch.

Figure 2:
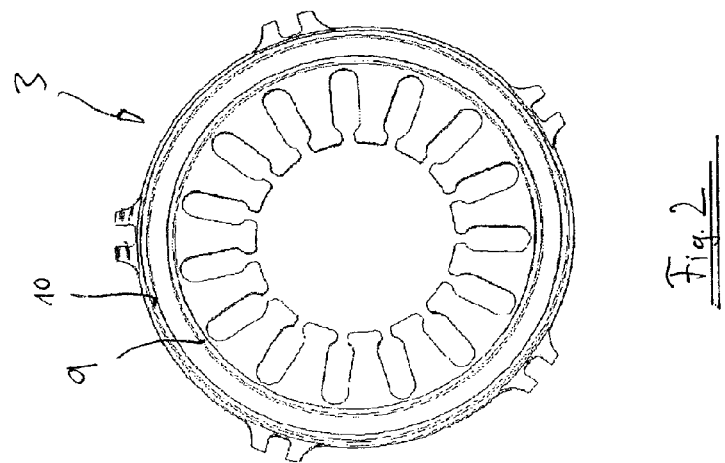
FIG. 2 is a top view of the starting spring of a starting clutch according to an embodiment of the invention.

FIG. 2 is a top view of the starting spring 3 viewed from the second diaphragm spring 4. The first ring-shaped surrounding elevation 9 and the second ring-shaped surrounding elevation 10 arranged radially outside the latter are clearly visible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A starting clutch having clutch plates through which torque may be transferred between a clutch cage of the starting clutch and a clutch hub when the starting clutch is closed, comprising:
   a set of springs including at least two diaphragm-spring-type spring elements;
   wherein viewed from a side of the diaphragm springs, one of a first and second spring element of the at least two spring elements has a first elevation on a side facing the other one of the second or first spring element, the first elevation pressing against the other one of the second or first spring element when the starting clutch is closed,
   a ring-shaped pressure element arranged between the first spring element and a first of said clutch plates, an area of highest surface pressure existing between the first spring element and the pressure element; and
   wherein the first elevation is located at a radial distance from a rotational axis of the starting clutch that is substantially the same as the area of highest surface pressure.

2. The starting clutch according to claim 1, wherein viewed from the side of the diaphragm springs, said one of the first and second spring elements having the first elevation comprises a second elevation on the side facing the other one of the second or first spring element, the second elevation pressing against the other one of the second or first spring element when the starting clutch is closed.

3. The starting clutch according to claim 2, wherein the first and second spring elements contact one another exclusively by the first and second elevations when the starting clutch is closed.

4. The starting clutch according to claim 3, wherein the second elevation is located radially outward from the first elevation with respect to a rotational axis of the starting clutch.

5. The starting clutch according to claim 2, wherein the second elevation is located radially outward from the first elevation with respect to a rotational axis of the starting clutch.

6. The starting clutch according to claim 2, wherein the first and second elevations are provided on a side of the first spring element facing the second spring element.

7. The starting clutch according to claim 1, wherein the first elevation is provided on a side of the first spring element facing the second spring element.

* * * * *